(12) United States Patent
Cohen et al.

(10) Patent No.: US 9,151,448 B2
(45) Date of Patent: Oct. 6, 2015

(54) METHOD FOR DISPENSING COMPRESSED GASES

(71) Applicant: Air Products and Chemicals, Inc., Allentown, PA (US)

(72) Inventors: Joseph Perry Cohen, Bethlehem, PA (US); David John Farese, Riegelsville, PA (US); Brian Bernard Bonner, Nesquehoning, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 174 days.

(21) Appl. No.: 13/826,494

(22) Filed: Mar. 14, 2013

(65) Prior Publication Data
US 2014/0261863 A1      Sep. 18, 2014

(51) Int. Cl.
*F17C 5/06*      (2006.01)

(52) U.S. Cl.
CPC ........... *F17C 5/06* (2013.01); *F17C 2201/0104* (2013.01); *F17C 2201/035* (2013.01); *F17C 2201/056* (2013.01); *F17C 2205/0134* (2013.01); *F17C 2205/0338* (2013.01); *F17C 2221/012* (2013.01); *F17C 2221/033* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/043* (2013.01); *F17C 2250/01* (2013.01); *F17C 2250/032* (2013.01); *F17C 2250/043* (2013.01); *F17C 2250/0439* (2013.01); *F17C 2260/025* (2013.01); *F17C 2265/061* (2013.01); *F17C 2265/063* (2013.01); *F17C 2270/0171* (2013.01); *Y02E 60/321* (2013.01)

(58) Field of Classification Search
CPC ................ F17C 5/06; F17C 2227/041; F17C 2227/042; F17C 2227/043; F17C 2250/032
USPC ................... 141/3, 20, 95, 234–238; 137/263
See application file for complete search history.

(56) References Cited

U.S. PATENT DOCUMENTS

| | | | |
|---|---|---|---|
| 5,513,678 A | 5/1996 | Schultz et al. | |
| 6,382,227 B1 | 5/2002 | Birch et al. | |
| 6,708,573 B1 * | 3/2004 | Cohen et al. | 73/865 |
| 7,568,507 B2 * | 8/2009 | Farese et al. | 141/95 |
| 7,905,252 B2 * | 3/2011 | Neumann et al. | 137/606 |
| 8,056,577 B2 * | 11/2011 | Street et al. | 137/263 |
| 8,156,970 B2 * | 4/2012 | Farese et al. | 141/94 |
| 8,443,820 B2 * | 5/2013 | Ulrey et al. | 137/1 |
| 2007/0034283 A1 * | 2/2007 | Plummer et al. | 141/234 |

(Continued)

FOREIGN PATENT DOCUMENTS

| | | |
|---|---|---|
| EP | 1559949 A1 | 8/2005 |
| JP | 2004084808 A | 3/2004 |
| JP | 2005273811 A | 10/2005 |

(Continued)

*Primary Examiner* — Timothy L Maust
(74) *Attorney, Agent, or Firm* — Bryan C. Hoke, Jr.

(57) ABSTRACT

Method for dispensing a compressed gas using at least three dispensing protocols, the selected dispensing protocol depending on the time-averaged dispensing rate. Compressed gas is passed from a plurality of supply vessels, for example a tube trailer, to a plurality of storage vessels, and dispensed from the plurality of storage vessels to a plurality of receiving vessels. The supply vessel providing the compressed gas depends on the compressed gas pressure in the supply vessel and the anticipated time-averaged dispensing rate for the time period.

17 Claims, 1 Drawing Sheet

(56) References Cited

U.S. PATENT DOCUMENTS

2012/0031525 A1* 2/2012 Wonders .................. 141/4
2012/0318403 A1   12/2012 Cohen et al.

FOREIGN PATENT DOCUMENTS

| JP | 2008232979 A | 10/2008 |
| JP | 2011033146 A | 2/2011 |

* cited by examiner

METHOD FOR DISPENSING COMPRESSED GASES

CROSS-REFERENCE TO RELATED APPLICATIONS

This patent application is related to U.S. patent application Ser. No. 13/826,616, entitled "Method for Dispensing Compressed Gases," contemporaneously filed on 14 Mar. 2013.

BACKGROUND

The present invention relates to a method for delivering a compressed gases, such as hydrogen or another compressed gas, to a receiving tank, such as a vehicle fuel tank. Although the invention is discussed herein with regard to delivery of compressed hydrogen gas to fuel tanks of hydrogen-powered vehicles, persons skilled in the art will recognize that the invention has other applications. For example, it may be used to deliver other compressed gases which may or may not be used as fuels, and the compressed gases may be delivered to various types of receiving tanks other than vehicle fuel tanks.

Hydrogen compressed gas is oftentimes supplied through the use of tube trailers. Tube trailers may be filled at a supply depot, offloaded via a compressed gas dispensing station, and return to the supply depot for refilling.

Industry desires to deliver hydrogen and other compressed gases at high pressures, often exceeding the pressure of compressed gas in the tube trailers. The compressed gas from the tube trailer may be compressed further to storage vessels at a compressed gas dispensing station to high pressure compressed gas for dispensing to receiving vessels.

Industry desires to reduce the amount of residual gas in the tube trailer supply vessels prior to refilling the supply vessels. This will reduce the frequency of refilling the supply vessels.

Industry also desires to suitably provide compressed gas to receiving vessels, such that the receiving vessels obtain a sufficient and/or desired charge of compressed gas at any and all times, by maintaining storage vessels of a dispensing station at suitably high pressures.

BRIEF SUMMARY

The present invention relates to a method for dispensing a compressed gas.

There are several aspects of the method as outlined below.

Aspect 1. A method for dispensing a compressed gas, the method comprising:
(a) passing a first quantity of compressed gas from a supply vessel of a plurality of supply vessels to a storage vessel of a plurality of storage vessels via a pressure regulator valve and a compressor, wherein the first quantity of compressed gas when initially withdrawn from the supply vessel has a pressure greater than a set point pressure of the pressure regulator valve, and wherein the storage vessel receiving the first quantity of compressed gas initially receives the first quantity of compressed gas at a pressure less than a first threshold pressure for the plurality of storage vessels, said passing of the first quantity of compressed gas from the supply vessel to the storage vessel occurring when the compressed gas pressure in another storage vessel of the plurality of storage vessels is greater than the first threshold pressure for the plurality of storage vessels;
(b) passing a second quantity of compressed gas from a supply vessel of the plurality of supply vessels to a storage vessel of the plurality of storage vessels via the pressure regulator valve and the compressor, wherein the second quantity of compressed gas when initially withdrawn from the supply vessel has a pressure less than the set point pressure of the pressure regulator valve and greater than a minimum compressor inlet pressure of the compressor, and wherein the storage vessel receiving the second quantity of compressed gas initially receives the second quantity of compressed gas at a pressure less than a second threshold pressure for the plurality of storage vessels, said passing of the second quantity of compressed gas from the supply vessel to the storage vessel occurring when the compressed gas pressure in all of the other storage vessels of the plurality of storage vessels is less than the second threshold pressure for the plurality of storage vessels;
(c) passing a third quantity of compressed gas from a supply vessel of the plurality of supply vessels to a storage vessel of the plurality of storage vessels via the pressure regulator valve and the compressor, wherein the third quantity of compressed gas when initially withdrawn from the supply vessel has a pressure less than the set point pressure of the pressure regulator valve and greater than the minimum compressor inlet pressure, and wherein the storage vessel receiving the third quantity of compressed gas initially receives the third quantity of compressed gas at a pressure less than a third threshold pressure for the plurality of storage vessels, said passing of the third quantity of compressed gas from the supply vessel to the storage vessel occurring when the compressed gas pressure in another storage vessel of the plurality of storage vessels is greater than the third threshold pressure for the plurality of storage vessels; and
(d) dispensing at least a portion of the first quantity of compressed gas, at least a portion of the second quantity of compressed gas, and at least a portion of the third quantity of compressed gas to one or more receiving vessels.

Aspect 2. The method of aspect 1 wherein two or more of the first quantity of compressed gas, the second quantity of compressed gas, and the third quantity of compressed gas are withdrawn from the same supply vessel.

Aspect 3. The method of aspect 1 wherein each of the first quantity of compressed gas, the second quantity of compressed gas, and the third quantity of compressed gas are withdrawn from different supply vessels.

Aspect 4. A method for dispensing a compressed gas, the method comprising:
(a) passing a first quantity of compressed gas from a first supply vessel of a plurality of supply vessels to a first storage vessel of a plurality of storage vessels via a pressure regulator valve and a compressor, wherein the first quantity of compressed gas, when initially withdrawn from the supply vessel, has a pressure greater than a set point pressure of the pressure regulator valve, and wherein the first storage vessel receiving the first quantity of compressed gas initially receives the first quantity of compressed gas at a pressure less than a first threshold pressure for the plurality of storage vessels, said passing of the first quantity of compressed gas from the first supply vessel to the first storage vessel occurring when the compressed gas pressure in another storage vessel of the plurality of storage vessels is greater than the first threshold pressure for the plurality of storage vessels;
(b) passing a second quantity of compressed gas from a second supply vessel of the plurality of supply vessels to a second storage vessel of the plurality of storage vessels via the pressure regulator valve and the compressor, wherein the second quantity of compressed gas when initially withdrawn from the second supply vessel has a pressure less than the set point pressure of the pressure regulator valve, and wherein the second storage vessel receiving the second quantity of compressed gas initially receives the second quantity of compressed gas at a pressure less than a second threshold pressure for the plurality of storage vessels, said passing of the second quantity of compressed gas from the second supply vessel to the second storage vessel occurring when the compressed gas pressure in all of the other storage vessels of the plurality of storage vessels (that is, those not receiving the second quantity of compressed gas) is less than the second threshold pressure for the plurality of storage vessels;

(c) passing a third quantity of compressed gas from a third supply vessel of the plurality of supply vessels to a third storage vessel of the plurality of storage vessels via the pressure regulator valve and the compressor, wherein the third quantity of compressed gas when initially withdrawn from the third supply vessel has a pressure less than the set point pressure of the pressure regulator valve, and wherein the third storage vessel receiving the third quantity of compressed gas initially receives the third quantity of compressed gas at a pressure less than a third threshold pressure for the plurality of storage vessels, said passing of the third quantity of compressed gas from the third supply vessel to the third storage vessel occurring when the compressed gas pressure in another storage vessel of the plurality of storage vessels is greater than the third threshold pressure for the plurality of storage vessels; and (d) dispensing the first quantity of compressed gas, the second quantity of compressed gas, and the third quantity of compressed gas to one or more receiving vessels.

Aspect 5. The method of any one of aspects 1 to 4 wherein, in step (a), the compressed gas pressure in all of the other storage vessels of the plurality of storage vessels is greater than the first threshold pressure.

Aspect 6. The method of any one of aspects 1 to 5 wherein, in step (a), the compressed gas pressure in the supply vessel from which the first quantity of compressed gas is withdrawn is the lowest pressure of any other supply vessel that has a compressed gas pressure greater than the set point pressure of the pressure regulator valve when the first quantity of compressed gas is initially withdrawn from the supply vessel.

Aspect 7. The method of any one of aspects 1 to 6 wherein, in step (c), the compressed gas pressure in all of the other storage vessels of the plurality of storage vessels is greater than the third threshold pressure.

Aspect 8. The method of any one of aspects 1 to 7 wherein, in step (c), the compressed gas pressure in the supply vessel from which the third quantity of compressed gas is withdrawn is the lowest pressure of any other supply vessel that has a compressed gas pressure greater than the minimum compressor inlet pressure when the third quantity of compressed gas is initially withdrawn from the supply vessel.

Aspect 9. The method of any one of aspects 1 to 8, further comprising:
prior to step (b) calculating a threshold pressure needed to supply the compressor to meet a desired time-averaged dispensing rate;
wherein, in step (b), the compressed gas pressure in the supply vessel from which the second quantity of compressed gas is withdrawn is greater than the threshold pressure when the second quantity of compressed gas is initially withdrawn from the supply vessel.

Aspect 10. The method of any one of aspects 1 to 8, further comprising:
prior to step (b) calculating a threshold pressure needed to supply the compressor to meet a desired time-averaged dispensing rate;
wherein, in step (b), the compressed gas pressure in the supply vessel from which the second quantity of compressed gas is withdrawn is the lowest pressure of any other supply vessel that has a compressed gas pressure greater than the threshold pressure when the second quantity of compressed gas is initially withdrawn from the supply vessel.

Aspect 11. The method of any one of the preceding aspects wherein the first threshold pressure is greater than 20 MPa and less than a maximum allowable pressure for any of the plurality of storage vessels.

Aspect 12. The method of any one of the preceding aspects wherein the second threshold pressure is between 3 and 20 MPa.

Aspect 13. The method of any one of the preceding aspects wherein the third threshold pressure is greater than 3 MPa and less than a maximum allowable pressure for any of the plurality of storage vessels.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

As used herein, the term "plurality" means two or more.

Unless otherwise noted, all pressure values used herein are gauge pressures.

In the claims, letters may be used to identify claimed steps (e.g. (a), (b), and (c)). These letters are used to aid in referring to the method steps and do not indicate the order in which claimed steps are performed, unless and only to the extent that such order is specifically recited in the claims.

For the purposes of simplicity and clarity, detailed descriptions of well-known devices, circuits, and methods are omitted so as not to obscure the description of the present invention with unnecessary detail.

The present invention relates to a method for dispensing a compressed gas to receiving vessels.

As used herein, the term "compressed gas" encompasses supercritical fluids and pressurized gases (gases at a pressure greater than 1 atm. (absolute) and less than the critical pressure of the gas or a temperature less than the critical temperature of the gas). The compressed gas may be a single species or a mixture of species. The compressed gas may be hydrogen. The compressed gas may be natural gas.

Receiving vessels may be any vessels suitable for receiving the compressed gas, for example vessels in cars, trucks, forklifts, or other vehicles which use the compressed gas.

The method is particularly suited for dispensing compressed gas when the time-averaged dispensing rate varies throughout the day and/or week. The time-averaged dispensing rate is the total amount of compressed gas dispensed during a specified time period (for example, in units of kg) divided by the length of the time period (for example, in units of hours). For example, 20 kg may be dispensed between the hours of 10 p.m. to 6 a.m., resulting in a time-averaged dispensing rate of 2.5 kg/h for the hours of 10 p.m. to 6 a.m. 10 kg may be dispensed between the hours of 6 a.m. and 7 a.m., resulting in a time-averaged dispensing rate of 10 kg/h for the hours of 6 a.m. to 7 a.m. 40 kg may be dispensed between the hours of 7 a.m. and 9 a.m., resulting in a time-averaged dispensing rate of 20 kg/h for the hours of 7 am. to 9 a.m.

Figure 1:
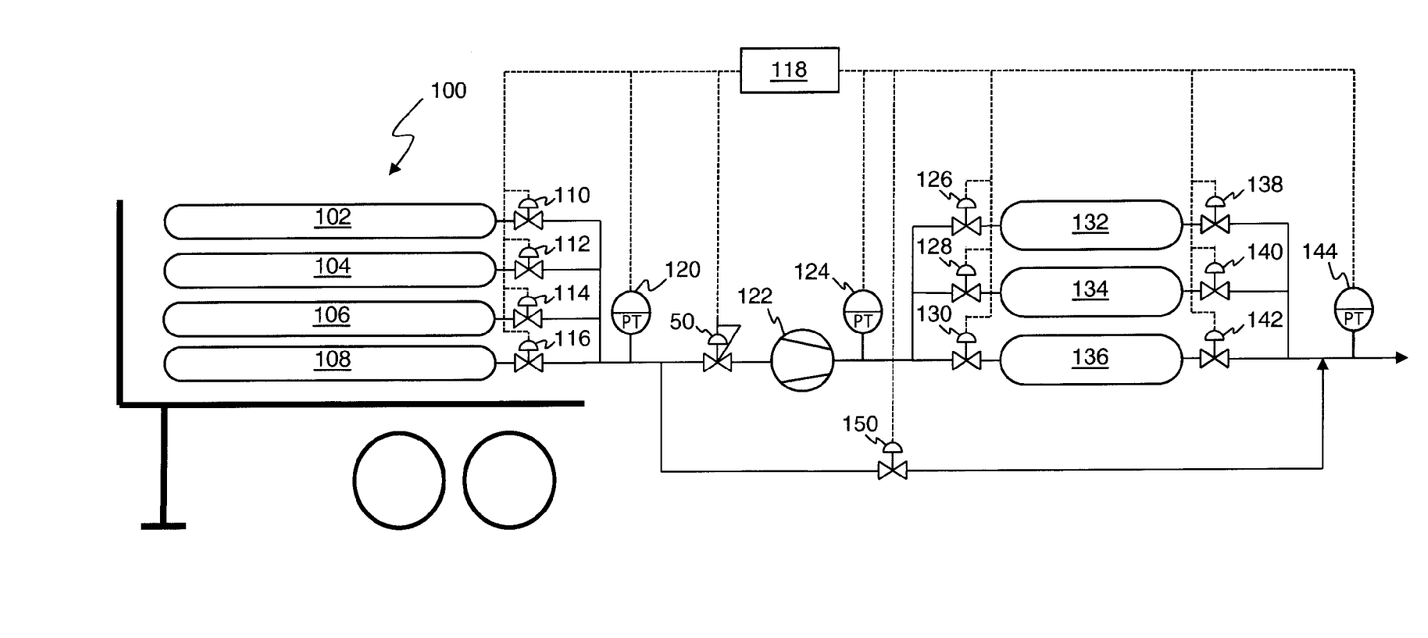
The sole FIGURE illustrates a compressed gas supply system.

The method will be better understood with reference to the FIGURE, where the FIGURE shows an apparatus suitable for carrying out the method.

The apparatus comprises a tube trailer 100. The tube trailer comprises a plurality of supply vessels 102, 104, 106, and 108 and associated valves 110, 112, 114, and 116. The tube trailer comprises at least two supply vessels and may comprise any suitable number of supply vessels greater than two. While shown as a single supply vessel 102, supply vessel 102 may be a tube bank comprising two or more vessels which are connected by a manifold with flow from the tube bank controlled by valve 110. Likewise supply vessels 104, 106, and 108 may each be a tube bank, each connected by a manifold with flow from each tube bank controlled by its respective valve 112, 114, and 116.

Compressed gas may be delivered to a compressed gas dispensing station via the tube trailer 100. The tube trailer may be filled at a supply depot, offloaded via the compressed gas dispensing station, and returned to the supply depot for refilling.

Multiple tube trailers may be used as described in U.S. Pat. Nos. 4,380,242, and 4,139,019, and U.S. patent application Ser. No. 12/785,761, each incorporated herein by reference to the extent that the disclosure therein does not conflict with the teachings of the present application.

The apparatus also comprises a pressure transmitter 120, pressure regulator valve 50, and compressor 122.

The pressure transmitter 120, pressure regulator valve 50 and compressor are typically part of the compressed gas dispensing station, which may be at a fixed location. Alternatively, the compressed gas dispensing station may be a mobile compressed gas dispensing station. The pressure transmitter 120 may alternatively be part of the tube trailer.

The compressor may be any suitable compressor for the dispensing application, for example, a Hydro-pak Inc. FLEXI-POWER™ compressor. Suitable compressors are commercially available and the skilled person can readily select suitable compressors.

The pressure regulator valve 50 is used to ensure that the input pressure to the compressor does not exceed the maximum allowable input pressure for the compressor. The pressure regulator valve has a set point pressure, which may be set by a user. The pressure regulator valve tries to maintain the pressure leaving the valve at the set point pressure while the input pressure varies. In case the input pressure to the pressure regulator valve is less than the set point pressure, the pressure regulator valve will move to the full open position so that the output pressure from the pressure regulator valve is substantially the same as the input pressure.

When the tube trailer first arrives at the dispensing station from a supply depot, the plurality of supply vessels 102, 104, 106, and 108 should be at full capacity, and at a pressure much greater than the maximum allowable pressure to the compressor, for example about 50 MPa. The maximum allowable pressure to the compressor depends on the compressor selected and may be, for example, slightly more than about 20 MPa. Then the set point pressure for the pressure regulator valve 50 may be set to 20 MPa.

The apparatus also comprises a plurality storage vessels 132, 134, and 136. The plurality of storage vessels comprise at least two storage vessels and may comprise any suitable number of supply vessels greater than two. While shown as a single storage vessel 132, storage vessel 132 may be a tube bank comprising two or more vessels which are connected by a manifold with flow to the tube bank controlled by valve 126 and flow from the tube bank controlled by valve 138. Likewise, storage vessel 134 may be a tube bank, connected by a manifold with flow to and from tube bank controlled by valves 128, and 140, respectively, and storage vessel 136 may be a tube bank, connected by a manifold with flow to and from tube bank controlled by valves 130, and 142, respectively.

Compressed gas from a supply vessel 102, 104, 106, or 108 passes through pressure regulator valve 50 to compressor 122. The pressure in each of supply vessels may be monitored by pressure transmitter 120 when the compressed gas is passed from each respective vessel. Alternatively, the pressure in each of the supply vessels may be monitored by separate pressure transmitters mounted to each respective supply vessel. The discharge pressure from compressor 122 may be monitored by pressure transmitter 124. Compressed gas is passed to a storage vessel of the plurality of storage vessels 132, 134, and 136.

The plurality of storage vessels may be filled according to the method described in U.S. patent application Ser. No. 13/162,739, incorporated herein by reference.

The plurality of storage vessels 132, 134, and 136 may be selectively filled using valves 126, 128, and 130. The pressure in each of the plurality of storage vessels may be monitored by pressure transmitters (not shown) in each of storage vessels 132, 134, and 136, or by recording the pressure at the discharge pressure of the compressor by pressure transmitter 124 any time the fill valve is open, or by monitoring the dispenser supply pressure by pressure transmitter 144 any time one of the dispenser cascade valves 138, 140, or 142 are opened.

Compressed gas is passed from the plurality of storage vessels 132, 134, and 136 via conduit 148 to receiving vessels (not shown), typically using the known cascade technique, where compressed gas is withdrawn from a storage vessel having a lower compressed gas pressure and subsequently withdrawn from a storage vessel having a higher compressed gas pressure.

Compressed gas may also be passed directly from a supply vessel to a receiving vessel via bypass valve 150, without being passed through the regulator valve 50, compressor 122, and any of the plurality of storage vessels 132, 134 and 136. Compressed gas may bypass the compressor in case the compressed gas in any of the supply vessels is greater than the receiving vessel.

The operation of the valves to control the flow from the supply vessel to the storage vessels, and from the storage vessels to the receiving vessels is controlled by controller 118. Controller 118 may be any suitable controller, for example, a computer, PLC, and the like. Controller 118 may receive input signals from pressure transmitters 120, 124 and 144. Controller 118 may send signals to open or close valves 110, 112, 114, 116, 126, 128, 130, 138, 140, and 142. Valves 110, 112, 114, 116, 126, 128, 130, 138, 140, and 142 may be actuated by any known means, for example, electrically actuated and pneumatically actuated.

The inventors have recognized that during different periods of the day, the demand for compressed gas varies, and that improved utilization of the supply vessels may be obtained by matching the supply vessel that provides the compressed gas to the receiving vessels to the expected demand for the period.

For example, during the hours of 9:00 p.m. to 6:00 a.m., the demand for compressed gas may be low, a so-called "low use" period, since most people are not out and about during these hours. During the hours of 6:00 a.m. and 7:00 a.m., the demand for compressed gas may be moderate, a so-called "moderate use" period, since people are starting to head to work. During the hours of 7:00 a.m. and 9:00 a.m., the demand for compressed gas may peak, a so-called "high use" period, since more and more people are out and about. During the hours of 9:00 a.m. and 11:00 a.m., the demand for compressed gas may be moderate, and then increase to high use during the hours of 11:00 a.m. and 1:00 p.m. During the hours of 1:00 p.m. and 4:00 p.m., the demand for compressed gas may be moderate while most people are at work, and then increase to high use during the hours of 4:00 p.m. and 7:00 p.m. as people return home from work. During the hours of 7:00 p.m. and 9:00 p.m. the demand for compressed gas may be moderate.

According the present method, dispensing of the compressed gas may be by at least three dispensing protocols: one for low use, one for moderate use, and another for high use. The timing of when to apply a specific dispensing protocol may anticipate actual use. For example, if the hours of 7:00 a.m. to 9:00 a.m. are high use, the high use dispensing protocol may start at 6:30 a.m. in preparation for the high use period.

The method comprises, during a first operating period (i.e. a so-called "high use" period), passing a first quantity of compressed gas from a supply vessel of a plurality of supply vessels 102, 104, 106, 108 to a storage vessel of a plurality of storage vessels 132, 134, 136 via a pressure regulator valve 50 and a compressor 122. The first quantity of compressed gas when initially withdrawn from the supply vessel has a pressure greater than a set point pressure of the pressure regulator valve 50. The pressure regulator valve 50 decreases the pressure of the compressed gas fed to the compressor 122 below the maximum allowable input pressure to the compressor 122. The storage vessel receiving the first quantity of compressed gas initially receives the first quantity of compressed gas at a pressure less than a first threshold pressure for the plurality of storage vessels.

The first threshold pressure is a pressure above which it is desired to maintain at least one storage vessel for suitable dispensing to receiving vessels, such that the receiving vessels obtain a sufficient and/or desired charge of compressed gas during the first, high use period. For receiving vessels having a target fill pressure of about 90 MPa, the first threshold pressure may be greater than 20 MPa. The upper limit for the threshold pressure may be limited to the maximum allowable pressure for the plurality of storage vessels, which may be, for example, 49 MPa for a composite-type vessel.

During this first, high use operating period, the compressor is at least initially fed from a supply vessel having a compressed gas pressure greater than the set point pressure of the pressure regulator. This ensures that the greatest flow rate of compressed gas is passed to the storage vessels during the high use period. When the pressure in the supply vessel decreases below the set point pressure of the pressure regulator valve, withdrawal of the compressed gas from the supply vessel may be terminated and compressed gas withdrawn from another supply vessel having a compressed gas pressure greater than the set point pressure of the pressure regulator valve. The supply vessel selected for supplying the first quantity of compressed gas may be the supply vessel having the lowest compressed gas pressure of any other supply vessel of the plurality of supply vessels having a compressed gas pressure greater than the set point pressure of the pressure regulator valve when the first quantity of gas is initially withdrawn from the supply vessel.

During this first, high use operating period, the first quantity of compressed gas is passed from the supply vessel to the storage vessel even when the compressed gas pressure in another storage vessel of the plurality of storage vessels is greater than the first threshold pressure for the plurality of storage vessels. During this first, high use operating period, the first quantity of compressed gas may even be passed from the supply vessel to the storage vessel when the compressed gas pressures in all of the other storage vessels of the plurality of storage vessels are greater than the first threshold pressure for the plurality of storage vessels. During this first, high use operating period it is desirable to try to maintain as many storage vessels as possible at a pressure greater than the first threshold pressure.

The first quantity of compressed gas may continue to be passed from the supply vessel to the storage vessel after the compressed gas pressure in the supply vessel decreases below the set point pressure of the pressure regulator valve and/or after the pressure in the storage vessel receiving the first quantity of compressed gas increases above the first threshold pressure. Compressed gas may be introduced into the storage vessel until the compressed gas pressure is within a desired maximum compressed gas pressure range for the storage vessel.

The method also comprises, during a second operating period (i.e. a so-called "moderate use" period), passing a second quantity of compressed gas from a supply vessel of a plurality of supply vessels 102, 104, 106, 108 to a storage vessel of a plurality of storage vessels 132, 134, 136 via a pressure regulator valve 50 and a compressor 122. The second quantity of compressed gas when initially withdrawn from the supply vessel has a pressure less than the set point pressure of the pressure regulator valve 50 and greater than a minimum compressor inlet pressure of the compressor. The storage vessel receiving the second quantity of compressed gas initially receives the second quantity of compressed gas at a pressure less than a second threshold pressure for the plurality of storage vessels.

The second threshold pressure is a pressure above which it is desired to maintain at least one storage vessel for suitable dispensing to receiving vessels, such that the receiving vessels obtain a sufficient and/or desired charge of compressed gas during the second, moderate use period. For receiving vessels having a target fill pressure of about 90 MPa, the first threshold pressure may be greater than 20 MPa. The second threshold pressure may be the same as the first threshold pressure.

During this second, moderate use operating period, the compressor is at least initially fed from a supply vessel having a compressed gas pressure less than the set point pressure of the pressure regulator. During the moderate use operating period, because the rate of withdrawal from the storage vessels is less than during the high use period, the pressure of the compressed gas in the storage vessels can be suitably maintained above the second threshold pressure, even when the supply pressure from the supply vessels is less than set point pressure of the pressure regulator valve.

During the entire moderate use operating period, the compressed gas may be supplied from supply vessels having compressed gas pressures less than the set point pressure of the pressure regulator.

During this second, moderate use operating period, the second quantity of compressed gas is passed from the supply vessel to the storage vessel when the compressed gas pressure in all of the other storage vessels of the plurality of storage vessels is less than the second threshold pressure for the plurality of storage vessels. At least during a portion of the second, moderate use operating period, all of the other storage vessels will have a compressed gas pressure less than the second threshold pressure when the second quantity of compressed gas is passed from the supply vessel to the storage vessel. However, another of the storage vessels may have a pressure greater than the second threshold pressure during a portion of the second, moderate use operating period. During this second, moderate use operating period it is desirable to try to maintain only one storage vessel at a time at a pressure greater than the second threshold pressure.

Prior to passing the second quantity of compressed gas from a supply vessel to a storage vessel, the method may comprise calculating a threshold pressure needed to supply the compressor to meet a desired time-averaged dispensing rate. The second quantity of gas may then be withdrawn from a supply vessel at least initially having a compressed gas pressure greater than the threshold pressure needed to supply the compressor to meet the desired time-averaged dispensing rate. The second quantity of gas may be withdrawn from a supply vessel having the lowest compressed gas pressure greater than the threshold pressure with the second quantity of compressed gas is initially withdrawn from the supply vessel.

The threshold pressure needed to supply the compressor to meet a desired time-averaged dispensing rate may be calculated.

The flow rate through a compressor may be approximated by a linear function of the inlet suction pressure up to maximum allowable inlet suction pressure, e.g. $F = A \times P_{suction} + B$, where F is flow rate through the compressor, $P_{suction}$ is the inlet suction pressure, and A and B are parameters characterizing the relationship between inlet suction pressure and flow rate for the compressor. For example for a Hydro-pak Inc. FLEXI-POWER™ compressor, A=14.296 and B=26.378 where the flow rate has units of grams $H_2$/minute and the inlet suction pressure has units of MPa.

The relationship between the flow rate and the inlet suction pressure may be rewritten for calculating the threshold pressure, where the inlet suction pressure is the threshold pressure and the flow rate is the desired flow rate. Then $P_{threshold} = (F - B)/A$, where Pthreshold has units of MPa and F has units of grams $H_2$/minute. The desired flow is the expected average station usage flow during the moderate use period in grams $H_2$/minute. This equation is based in the performance of a particular Hydro-pak Inc. FLEXI-POWER™ compressor. The equation would be modified to fit the flow of the actual compressor used at an actual station.

The method comprises, during a third operating period (i.e. a so-called "low use" period), passing a third quantity of compressed gas from a supply vessel of a plurality of supply vessels 102, 104, 106, 108 to a storage vessel of a plurality of storage vessels 132, 134, 136 via a pressure regulator valve 50 and a compressor 122. The third quantity of compressed gas when initially withdrawn from the supply vessel has a pressure less than a set point pressure of the pressure regulator valve 50 and greater than the minimum compressor inlet pressure. The storage vessel receiving the third quantity of compressed gas initially receives the third quantity of compressed gas at a pressure less than a third threshold pressure for the plurality of storage vessels.

The third threshold pressure is a pressure above which it is desired to maintain at least one storage vessel for suitable dispensing to receiving vessels, such that the receiving vessels obtain a sufficient and/or desired charge of compressed gas during the third, low use period. For receiving vessels having a target fill pressure of about 90 MPa, the third threshold pressure may be greater than 3 MPa. The third threshold pressure may be the same as or different than the first and/or second threshold pressure. The third threshold pressure is less than the maximum allowable pressure of the storage vessels.

During the third, low use operating period, the compressor is at least initially fed from a supply vessel having a compressed gas pressure less than the set point pressure of the pressure regulator. During the low use operating period, because the rate of withdrawal from the storage vessels is less than during the moderate and high use periods, the pressure of the compressed gas in the storage vessels can be suitably maintained above the third threshold pressure, even when the supply pressure from the supply vessels is less than set point pressure of the pressure regulator valve. During the third, low use operating period, there is no need to draw from high pressure supply vessels having a compressed gas pressure greater than the set point pressure of the pressure regulator 50. Supply vessels having a compressed gas pressure greater than the set point pressure of the pressure regulator can be saved for high use operating periods.

During the third, low use operating period, the third quantity of compressed gas is passed from the supply vessel to the storage vessel even when the compressed gas pressure in another storage vessel of the plurality of storage vessels is greater than the third threshold pressure for the plurality of storage vessels. During the third, low use operating period, the third quantity of compressed gas may even be passed from the supply vessel to the storage vessel when the compressed gas pressures in all of the other storage vessels of the plurality of storage vessels are greater than the third threshold pressure for the plurality of storage vessels. During the third, low use operating period it is desirable to try to maintain as many storage vessels as possible at a pressure greater than the third threshold pressure and to supply to the storage vessels with compressed gas from supply vessels having compressed gas pressures less than the set point pressure of the pressure regulator valve.

During the third, low use operating period, it may be desirable to withdraw compressed gas from the supply vessels of the plurality of supply vessels having the lowest pressure compared to the other supply vessels, as long as the compressed gas pressure is greater than the minimum compressor inlet pressure of the compressor 122. During the third, low use operating period, compressed gas is scavenged from the supply vessels having lower compressed gas pressures; compressed gas pressures that might otherwise be unsuitable for supply during the first, high use operating period, or during the second, moderate use operating period.

At least one of the plurality of storage vessels will be charged with a portion or all of the first quantity of gas, at least one of the plurality of storage vessels will be charged with a portion or all of the second quantity of gas, and at least one of the plurality of storage vessels will be charged with a portion or all of the third quantity of gas.

The method comprises dispensing at least a portion of the first quantity of compressed gas, at least a portion of the second quantity of compressed gas, and at least a portion of the third quantity of compressed gas to one or more receiving vessels.

Dispensing of the first quantity of compressed gas to one or more receiving vessels may take place at any time after the first quantity of compressed gas has been passed to the storage vessel receiving the first quantity of compressed gas and may take place during one of the other gas passing steps. Dispensing of the first quantity of gas from a storage vessel to a receiving vessel may be contemporaneous with passing of the first quantity from a supply vessel to the storage vessel, but typically will be subsequent to the passing of the first quantity from a supply vessel to the storage vessel.

Dispensing of the second quantity of compressed gas to one or more receiving vessels may take place at any time after the second quantity of compressed gas has been passed to the storage vessel receiving the second quantity of compressed gas and may take place during one of the other gas passing steps. Dispensing of the second quantity of gas from a storage vessel to a receiving vessel may be contemporaneous with passing of the second quantity from a supply vessel to the storage vessel, but typically will be subsequent to the passing of the second quantity from a supply vessel to the storage vessel.

Dispensing of the third quantity of compressed gas to one or more receiving vessels may take place at any time after the third quantity of compressed gas has been passed to the storage vessel receiving the third quantity of compressed gas and may take place during one of the other gas passing steps. Dispensing of the third quantity of gas from a storage vessel to a receiving vessel may be contemporaneous with passing of the third quantity from a supply vessel to the storage vessel, but typically will be subsequent to the passing of the third quantity from a supply vessel to the storage vessel.

Two or more of the first quantity of compressed gas, the second quantity of compressed gas, and the third quantity of compressed gas may be withdrawn from the same supply vessel. For example, the compressed gas in a first supply vessel of the plurality of supply vessels may have a pressure greater than the set point pressure of the pressure regulator valve during a high use period and compressed gas may be withdrawn from the first supply vessel during the high use period. As compressed gas is withdrawn, the pressure in the first supply vessel may decrease below the set point pressure of the pressure regulator valve. During a moderate use period and/or a low use period, the compressed gas in the first supply vessel may have a pressure less than the set point pressure of the pressure regulator valve and compressed gas may be withdrawn from the first supply vessel during the moderate use period and/or the low use period.

Two or more of the first quantity of compressed gas, the second quantity of compressed gas, and the third quantity of compressed gas may be passed to the same storage vessel of the plurality of storage vessels 132, 134, and 136. For example, the compressed gas in a first storage vessel of the plurality of storage vessels may have a pressure less than the first threshold pressure during a high use period and compressed gas may be passed to the first storage vessel during the high use period. The compressed gas in the first storage vessel may have a pressure less than the second threshold pressure during a moderate use period and compressed gas may be passed to the first storage vessel during the moderate use period. The compressed gas in the first storage vessel may have a pressure less than the third threshold pressure during a low use period and compressed gas may be passed to the first storage vessel during the low use period.

Each of the first quantity of compressed gas, the second quantity of compressed gas, and the third quantity of compressed gas may be withdrawn from different supply vessels. For example, the compressed gas in a first supply vessel of the plurality of supply vessels may have a pressure greater than the set point pressure of the pressure regulator valve during a high use period and compressed gas may be withdrawn from the first supply vessel during the high use period but only to an extent where the compressed gas pressure is still greater than the set point pressure of the pressure regulator valve. During a later moderate use period, the compressed gas may be withdrawn from a second supply vessel of the plurality of supply vessels during the moderate use period, the second supply vessel having a compressed gas pressure less than the set point pressure of the pressure regulator valve. During a later low use period, compressed gas may be withdrawn from the second supply vessel or a third supply vessel of the plurality of supply vessels, the second supply vessel or the third supply vessel having a compressed gas pressure less than the set point pressure of the pressure regulator valve.

Each of the first quantity of compressed gas, the second quantity of compressed gas, and the third quantity of compressed gas may be passed to different supply vessels. For example, the compressed gas in a first storage vessel of the plurality of storage vessels may have a pressure less than the first threshold pressure during a high use period and compressed gas may be passed to the first storage vessel during the high use period. The compressed gas in the first storage vessel may have a pressure greater than the second threshold pressure during a moderate use period and compressed gas may be passed to a second storage vessel during the moderate use period. The compressed gas in the first storage vessel and the second storage vessel may have a pressure greater than the third threshold pressure during a low use period and compressed gas may be passed to third storage vessel during the low use period.

Through the use of at least 3 dispensing protocols applied during different compressed gas demand operating periods, the utilization of the supply vessels can be improved as illustrated in the following examples.

EXAMPLE

The hydrogen fueling station in this example has four 2000 liter supply vessels that have a pressure of 52 MPa when full. The station will have three storage vessels of 340 liters each that will have a pressure of 90 MPa when full, and that may be used until the pressure goes down to 50 MPa. A low use period might be the time between 9:00 PM and 6:00 AM when station is not likely to see more than one or two customers during the entire time period. The high use period might be a time such as between 7:00 am and 9:00 am where the station is likely to see multiple consecutive customers. The medium use period is any time that is neither high nor low.

When a trailer carrying the supply vessels first arrives from a supply depot, the pressure in all four supply vessels is 52 MPa, so the compressor will compress gas at the same speed during low, medium and high use periods until at least one of the supply vessels has a pressure less than 20 MPa. The only difference between the time periods is that during low and high use periods, the controller will run the compressor until all three storage vessels are completely full. During the medium use period, the station will only fill storage vessels as needed once the storage vessels have been emptied down to a pressure below 50 MPa, then the station will fill a depleted storage vessel until the pressure is about 90 MPa.

The compressor draws hydrogen from a first of the supply vessels until the pressure decreases below 20 MPa (the maximum inlet suction pressure for the compressor and the set point pressure of the pressure regulator valve). When the pressure in at least one supply vessel is between 3 and 20 MPa, the compressor will draw hydrogen from specific supply vessels depending on the time period; low use, moderate use, or high use. During a high use period, the station will search to draw from a supply vessel having a hydrogen pressure greater than 20 MPa. During the low use period, the station will search to draw hydrogen from a supply vessel having a pressure of at least 3 MPa rather than 20 MPa. During the moderate use period, the selection of the threshold pressure will be based on expected station usage. For example, if the station is expect to use 15 Kg/hr or 250 g/min, then the threshold pressure will be about 15.6 MPa. If the expected usage is slightly lower, say 2 cars at 5 kg each are expected to arrive, then the threshold pressure will be about 9.8 MPa.

By using this protocol, the station will be able to maintain full effectiveness until the supply vessel pressures are down to 3, 3, 3, and 20 MPa in the various supply vessels. The protocol will allow the station to use 83% of the hydrogen product delivered by the supply vessels. Without this protocol, the station would either not use as much of the product delivered by the supply vessels, or not be able to keep up with customer usage rates.

The invention claimed is:

1. A method for dispensing a compressed gas, the method comprising:
    (a) passing a first quantity of compressed gas from a supply vessel of a plurality of supply vessels to a storage vessel of a plurality of storage vessels via a pressure regulator valve and a compressor, wherein the first quantity of compressed gas when initially withdrawn from the supply vessel has a pressure greater than a set point pressure of the pressure regulator valve, and wherein the storage vessel receiving the first quantity of compressed gas initially receives the first quantity of compressed gas at a pressure less than a first threshold pressure for the plurality of storage vessels, said passing of the first quantity of compressed gas from the supply vessel to the storage vessel occurring when the compressed gas pressure in another storage vessel of the plurality of storage vessels is greater than the first threshold pressure for the plurality of storage vessels;
    (b) passing a second quantity of compressed gas from a supply vessel of the plurality of supply vessels to a storage vessel of the plurality of storage vessels via the pressure regulator valve and the compressor, wherein the second quantity of compressed gas when initially withdrawn from the supply vessel has a pressure less than the set point pressure of the pressure regulator valve and greater than a minimum compressor inlet pressure of the compressor, and wherein the storage vessel receiving the second quantity of compressed gas initially receives the second quantity of compressed gas at a pressure less than a second threshold pressure for the plurality of storage vessels, said passing of the second quantity of compressed gas from the supply vessel to the storage vessel occurring when the compressed gas pressure in all of the other storage vessels of the plurality of storage vessels is less than the second threshold pressure for the plurality of storage vessels;
    (c) passing a third quantity of compressed gas from a supply vessel of the plurality of supply vessels to a storage vessel of the plurality of storage vessels via the pressure regulator valve and the compressor, wherein the third quantity of compressed gas when initially withdrawn from the supply vessel has a pressure less than the set point pressure of the pressure regulator valve and greater than the minimum compressor inlet pressure, and wherein the storage vessel receiving the third quantity of compressed gas initially receives the third quantity of compressed gas at a pressure less than a third threshold pressure for the plurality of storage vessels, said passing of the third quantity of compressed gas from the supply vessel to the storage vessel occurring when the compressed gas pressure in another storage vessel of the plurality of storage vessels is greater than the third threshold pressure for the plurality of storage vessels; and
    (d) dispensing at least a portion of the first quantity of compressed gas, at least a portion of the second quantity of compressed gas, and at least a portion of the third quantity of compressed gas to one or more receiving vessels.

2. The method of claim 1 wherein two or more of the first quantity of compressed gas, the second quantity of compressed gas, and the third quantity of compressed gas are withdrawn from the same supply vessel.

3. The method of claim 1 wherein each of the first quantity of compressed gas, the second quantity of compressed gas, and the third quantity of compressed gas are withdrawn from different supply vessels.

4. The method of claim 1 wherein, in step (a), the compressed gas pressure in all of the other storage vessels of the plurality of storage vessels is greater than the first threshold pressure.

5. The method of claim 4 wherein, in step (a), the compressed gas pressure in the supply vessel from which the first quantity of compressed gas is withdrawn is the lowest pressure of any other supply vessel that has a compressed gas pressure greater than the set point pressure of the pressure regulator valve when the first quantity of compressed gas is initially withdrawn from the supply vessel.

6. The method of claim 1 wherein, in step (a), the compressed gas pressure in the supply vessel from which the first quantity of compressed gas is withdrawn is the lowest pressure of any other supply vessel that has a compressed gas pressure greater than the set point pressure of the pressure regulator valve when the first quantity of compressed gas is initially withdrawn from the supply vessel.

7. The method of claim 5 wherein, in step (c), the compressed gas pressure in all of the other storage vessels of the plurality of storage vessels is greater than the third threshold pressure.

8. The method of claim 1 wherein, in step (c), the compressed gas pressure in all of the other storage vessels of the plurality of storage vessels is greater than the third threshold pressure.

9. The method of claim 8 wherein, in step (c), the compressed gas pressure in the supply vessel from which the third quantity of compressed gas is withdrawn is the lowest pressure of any other supply vessel that has a compressed gas pressure greater than the minimum compressor inlet pressure when the third quantity of compressed gas is initially withdrawn from the supply vessel.

10. The method of claim 1 wherein, in step (c), the compressed gas pressure in the supply vessel from which the third quantity of compressed gas is withdrawn is the lowest pressure of any other supply vessel that has a compressed gas pressure greater than the minimum compressor inlet pressure when the third quantity of compressed gas is initially withdrawn from the supply vessel.

11. The method of claim 9, further comprising:
prior to step (b) calculating a threshold pressure needed to supply the compressor to meet a desired time-averaged dispensing rate;
wherein, in step (b), the compressed gas pressure in the supply vessel from which the second quantity of compressed gas is withdrawn is greater than the threshold pressure when the second quantity of compressed gas is initially withdrawn from the supply vessel.

12. The method of claim 1, further comprising:
prior to step (b) calculating a threshold pressure needed to supply the compressor to meet a desired time-averaged dispensing rate;
wherein, in step (b), the compressed gas pressure in the supply vessel from which the second quantity of compressed gas is withdrawn is greater than the threshold pressure when the second quantity of compressed gas is initially withdrawn from the supply vessel.

13. The method of claim 11, further comprising:
prior to step (b) calculating a threshold pressure needed to supply the compressor to meet a desired time-averaged dispensing rate;
wherein, in step (b), the compressed gas pressure in the supply vessel from which the second quantity of compressed gas is withdrawn is the lowest pressure of any other supply vessel that has a compressed gas pressure greater than the threshold pressure when the second quantity of compressed gas is initially withdrawn from the supply vessel.

14. The method of claim 1, further comprising:
prior to step (b) calculating a threshold pressure needed to supply the compressor to meet a desired time-averaged dispensing rate;
wherein, in step (b), the compressed gas pressure in the supply vessel from which the second quantity of compressed gas is withdrawn is the lowest pressure of any other supply vessel that has a compressed gas pressure greater than the threshold pressure when the second quantity of compressed gas is initially withdrawn from the supply vessel.

15. The method of claim 1 wherein the first threshold pressure is greater than 20 MPa and less than a maximum allowable pressure for any of the plurality of storage vessels.

16. The method of claim 1 wherein the second threshold pressure is between 3 and 20 MPa.

17. The method of claim 1 wherein the third threshold pressure is greater than 3 MPa and less than a maximum allowable pressure for any of the plurality of storage vessels.

* * * * *